(12) United States Patent
Han

(10) Patent No.: US 8,720,653 B2
(45) Date of Patent: May 13, 2014

(54) DRUM-INTEGRATED ELECTRIC PARKING BRAKE

(75) Inventor: Young Boo Han, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 84 days.

(21) Appl. No.: 13/428,386

(22) Filed: Mar. 23, 2012

(65) Prior Publication Data
US 2013/0087418 A1 Apr. 11, 2013

(30) Foreign Application Priority Data
Oct. 7, 2011 (KR) .......................... 10-2011-0102749

(51) Int. Cl.
*F16D 65/14* (2006.01)

(52) U.S. Cl.
USPC .......................................... 188/156; 188/2 D

(58) Field of Classification Search
USPC .................................. 188/2 D, 156, 158, 162
See application file for complete search history.

(56) References Cited

U.S. PATENT DOCUMENTS

| | | | | |
|---|---|---|---|---|
| 5,590,744 A * | 1/1997 | Belmond | ....................... | 188/265 |
| 6,533,082 B2 * | 3/2003 | Gill et al. | ....................... | 188/156 |
| 6,609,595 B2 * | 8/2003 | Flynn et al. | ................... | 188/156 |
| 6,755,284 B2 * | 6/2004 | Revelis et al. | ................. | 188/2 D |
| 6,782,978 B2 * | 8/2004 | Tachiiri et al. | ................. | 188/157 |
| 6,966,410 B1 * | 11/2005 | Tacker | ........................... | 188/2 D |
| 7,337,883 B2 | 3/2008 | Geyer | | |
| 7,779,968 B2 * | 8/2010 | Noh | ............................... | 188/2 D |
| 2002/0100647 A1 * | 8/2002 | Miyakawa et al. | ............ | 188/162 |
| 2007/0151816 A1 * | 7/2007 | Gil et al. | ......................... | 188/2 D |
| 2009/0308701 A1 * | 12/2009 | Gaul | ............................... | 188/2 D |

FOREIGN PATENT DOCUMENTS

| | | |
|---|---|---|
| JP | 7-277156 A | 10/1995 |
| JP | 2005-127509 A | 5/2005 |
| KR | 1020040019183 A | 3/2004 |
| KR | 10-2006-0030966 A | 4/2006 |
| KR | 10-2009-0039059 A | 4/2009 |
| KR | 1020100059146 A | 6/2010 |

* cited by examiner

*Primary Examiner* — Christopher Schwartz
(74) *Attorney, Agent, or Firm* — Morgan, Lewis & Bockius LLP

(57) ABSTRACT

A drum-integrated electric parking brake apparatus may include a drum brake in which a lining may be pivotally installed, and extends and presses a drum when a parking cable engaged with the lining may be pulled, an actuator selectively pulling the parking cable, a sensor member for detecting a rotation number of the actuator, and a controller for controlling the amount of current supplied to the actuator by detecting a change in the rotation number of the actuator.

6 Claims, 7 Drawing Sheets

DRUM-INTEGRATED ELECTRIC PARKING BRAKE

CROSS-REFERENCE TO RELATED APPLICATION

The present application claims priority to Korean Patent Application No. 10-2011-0102749 filed Oct. 7, 2011, the entire contents of which is incorporated herein for all purposes by this reference.

BACKGROUND OF THE INVENTION

1. Field of the Invention

The present invention relates to a drum-integrated electric parking brake which is electrically operated by an actuator to generate a parking brake force. More specifically, it relates to a drum-integrated electric parking brake which can reduce the weight and manufacturing cost and improve the marketability compared to an existing caliper-integrated electric parking brake.

2. Description of Related Art

In general, a parking brake for a vehicle is used to stop the vehicle on the road or ground during parking and includes a foot brake and a hand brake. Typically the hand brake is used in small vehicles and the foot brake is used in midsize and large vehicles.

As well known in the art, according to a conventional parking brake system, when a driver operates a parking lever provided in the vehicle, a parking cable pulls an operation lever of a rear drum brake and, at this time, a lining connected to the operating lever extends and presses a drum, thereby braking the wheels of the vehicle using a frictional force between the drum and the lining.

In more detail, according to the conventional parking brake system, when the parking cable is pulled by the parking lever, the operating lever attached to one lining in a drum brake is pulled in conjunction with the parking cable and, at this time, the lining extends from the center of the lining and comes into close contact with the friction surface of the drum, thereby parking the vehicle.

As such, according to the conventional parking brake system which provides the braking of the wheels by the operation of the parking lever, the driver should operate the parking lever by hand during each parking, which is very inconvenient. Moreover, the driver may forget to operate the parking lever during parking, and thus the risk of safety accidents may increase.

Therefore, an electric parking brake (EPB) has recently been developed and used, which can facilitate the parking operation using driving force of a motor during parking and safely maintain the parking state, thereby eliminating the inconvenience of the manual parking brake system. According to the electric parking brake, when a driver pushes an operation button in the vehicle to drive the motor, the packing cable is pulled by the rotation of the motor, and thus a uniform braking force is applied to each vehicle.

FIG. 1 is a diagram showing a conventional caliper-integrated electric parking brake which is configured by mounting a motor 2 on a caliper 1, in which a screw in front of the motor pushes a lining of a drum brake to come into close contact with the friction surface of the drum, thereby generating a parking brake force.

However, the conventional caliper-integrated electric parking brake uses the expensive caliper, and thus the material cost increases, which reduces the economic efficiency. Moreover, the conventional caliper-integrated electric parking brake is relatively heavy and thus is difficult to be applied to low-cost vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a drum-integrated electric parking brake which can reduce the weight and manufacturing cost, can improve the marketability, and thus can be applied to low-cost vehicles, compared to an existing caliper-integrated electric parking brake.

In an aspect of the present invention, a drum-integrated electric parking brake apparatus may include a drum brake in which a lining is pivotally installed, and extends and presses a drum when a parking cable engaged with the lining is pulled, an actuator selectively pulling the parking cable, a sensor member for detecting a rotation number of the actuator, and a controller for controlling the amount of current supplied to the actuator by detecting a change in the rotation number of the actuator.

The sensor member may include a magnet mounted in a drive shaft connected to the actuator, and a hall element detecting the rotation number of the magnet.

The drum-integrated electric parking brake apparatus may further include
a drive shaft connected to the actuator and rotated by a rotational force of the actuator, a driven shaft engaged with the drive shaft, and a power transmission shaft penetrating the driven shaft and engaged to the driven shaft, and moving linearly in an axial direction of the driven shaft by rotation of the drive shaft.

The power transmission shaft may include an anti-rotation sleeve formed integrally an end portion thereof to prevent the power transmission shaft from rotating together with the driven shaft.

The anti-rotation sleeve is slidably engaged with a case of the drum brake.

The case may include a lower case and an upper case, the anti-rotation sleeve being slidably engaged with the lower case of the drum brake.

A drive gear is formed to the drive shaft and a driven gear meshed with the drive gear is formed to the driven shaft, wherein first and second load support members are mounted on both sides of the driven gear, the first load support member being rotatably coupled to the upper case and the second load support member being rotatably supported onto an inner surface of the upper case.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
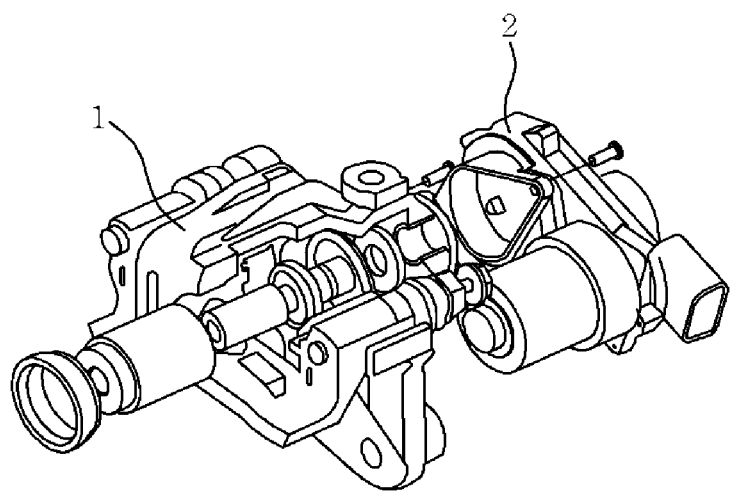
FIG. 1 is a diagram showing a conventional caliper-integrated electric parking brake.

Reference numerals set forth in the Drawings includes reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

As well known in the art, when a parking cable 12 is pulled, an operating lever 13 of a drum brake 10 is pulled in conjunction with the parking cable 12 and, at this time, a lining 14 connected to the operating lever 13 extends to brake wheels by a frictional force between a drum 11 and the lining 14.

The present invention provides a drum-integrated electric parking brake which operates the drum brake 10 by electrically pulling the parking cable 12 of the drum brake 10 and is automatically operated by an electric actuator 100, thereby generating a parking brake force.

In an exemplary embodiment of the present invention, the drum brake 10 has a structure in which when the parking cable 12 is automatically pulled by the electric actuator 100, the operating lever 13 is pulled in conjunction with the parking cable 12 and, at this time, the lining 14 attached to both shoes rotatably extends from the center of the lining 14 and comes into close contact with the drum 11, thereby generating a parking brake force.

The drum-integrated electric parking brake of the present invention is characterized in that the parking cable 12 of the drum brake 10 is automatically pulled by the touch of a button of a driver in a vehicle, which will be described in detail below.

Figure 2A:
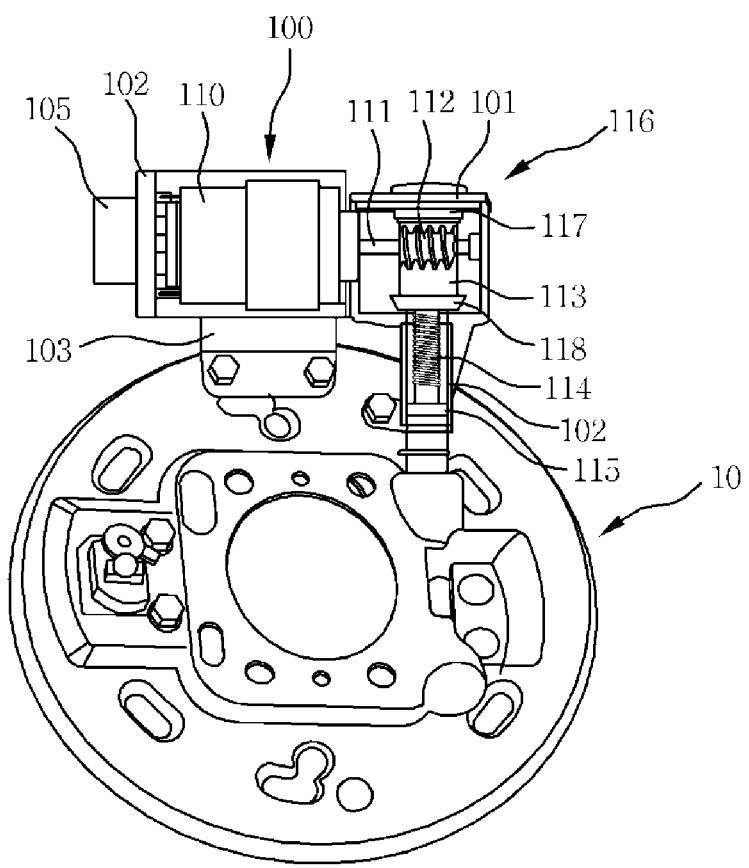
FIGS. 2A to 2C are diagrams showing a drum-integrated electric parking brake in accordance with an exemplary embodiment of the present invention.
Figure 2B:
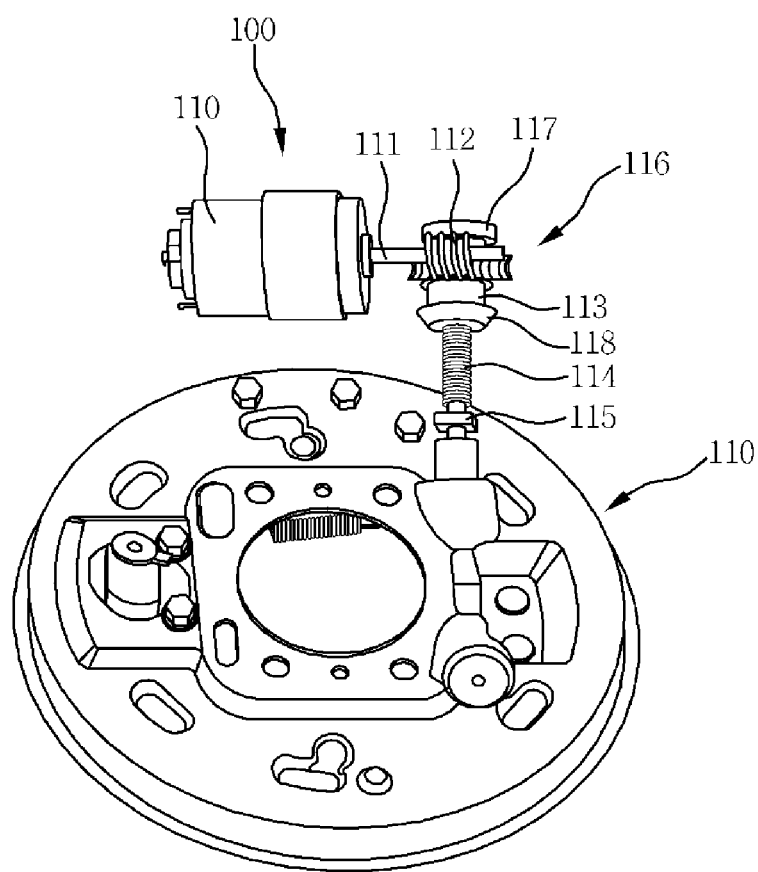
Figure 2C:
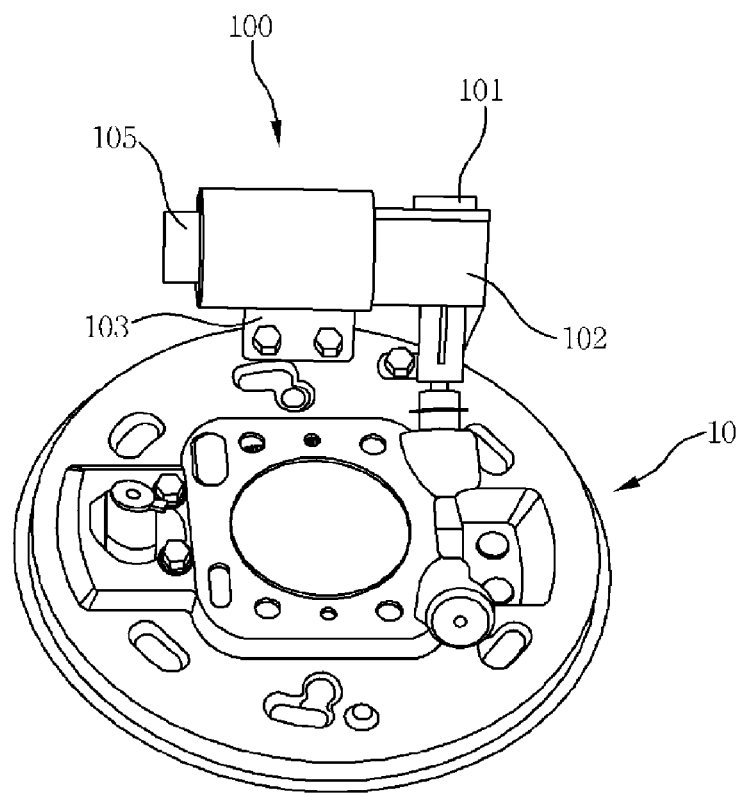

As shown in FIGS. 2A to 2C, the electric parking brake in accordance with en exemplary embodiment of the present invention generally includes a drum brake 10 and an electric actuator 100 for electrically pulling a parking cable 12 of the drum brake 10.

The electric actuator 100 includes a motor 110 which receives power in response to a control signal of a controller and provides power for the operation and the release of the operation of the drum brake 10, and a power change/transmission unit 116 which changes the direction of power output from the motor 110 and transmits the power to the parking brake 12 to pull or push the parking cable 12, the power change/transmission unit 116 being connected to the parking cable 12.

The power change/transmission unit 116 is disposed in front of the motor 110 and includes a drive shaft 111 rotated by the rotational force of the motor 110 and a driven shaft 113a for generating a rotational force changed in a direction perpendicular to the drive shaft 111. To this end, a drive gear 112 is mounted on the outer circumference of the drive shaft 111 and a driven gear 113 engaged with the drive gear 112 is mounted on the outer circumference of the driven shaft 113a such that the output direction of the motor 110 is changed.

The drive shaft 111 and the driven shaft 113a may use various types of gears to change the rotational direction of the motor 110 to be perpendicular and, for example, the drive gear 112 and the driven gear 113 may be configured as a worm gear and a worm wheel gear, respectively.

Moreover, a power transmission shaft 114, which moves linearly in conjunction with the rotation of the driven shaft 113a, is connected to the driven shaft 113a, and the parking cable 12 of the drum brake 10 is integrally connected to one end of the power transmission shaft 114.

In other words, the power transmission shaft 114 is configured to move linearly in the axial direction along the rotation of the driven shaft 113a.

Here, the driven shaft 113a is a ring member having threads formed on the inner circumference thereof and may be configured as a threaded nut, and the power transmission shaft 114 may be configured as a threaded bolt having threads formed on the outer circumference thereof.

Figure 3:
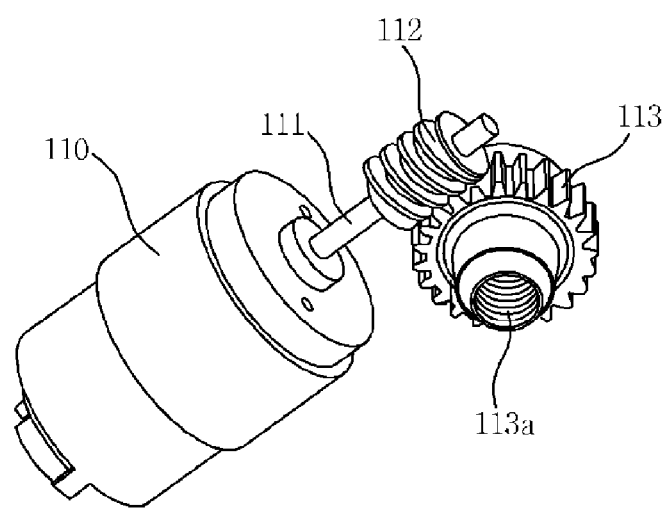
FIG. 3 is a diagram partially showing a power change/transmission unit of a drum-integrated electric parking brake in accordance with an exemplary embodiment of the present invention.
Figure 4:
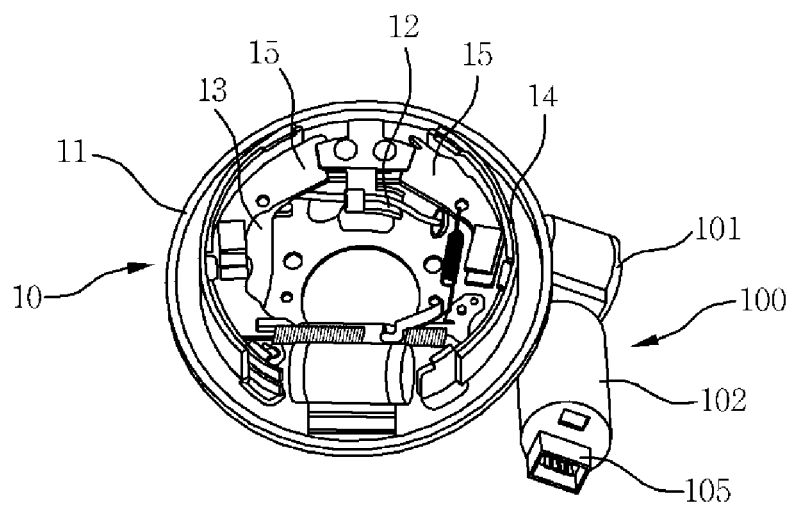
FIG. 4 is a diagram showing the drum-integrated electric parking brake in accordance with an exemplary embodiment of the present invention of FIG. 2C in the opposite direction.
Figure 5:
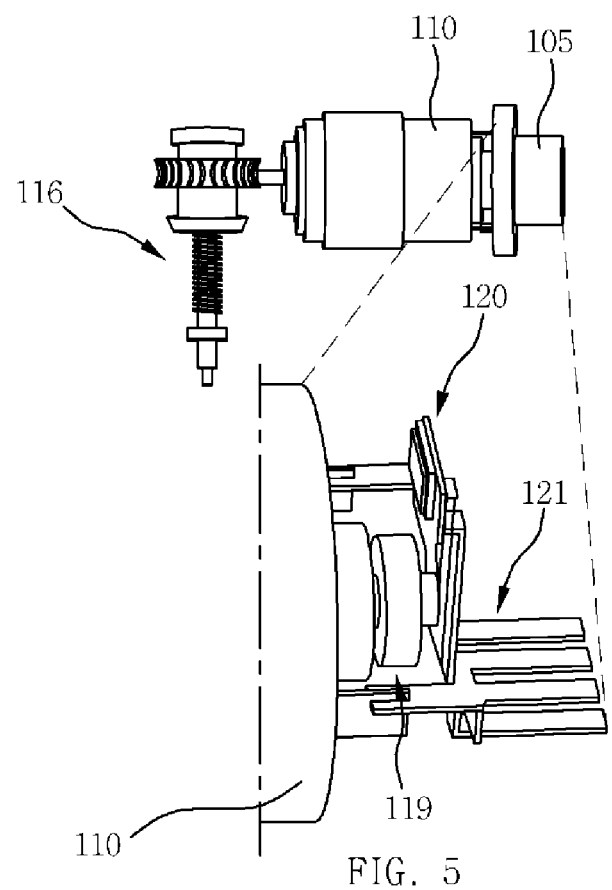
FIG. 5 is an enlarged view showing the internal structure of the rear of a motor in the drum-integrated electric parking brake in accordance with an exemplary embodiment of the present invention.
Figure 6A:
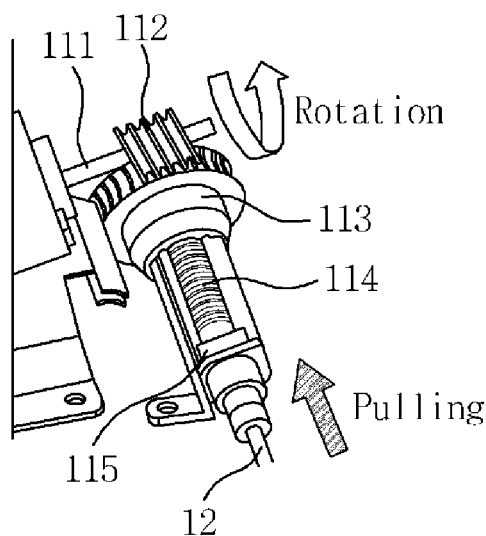
FIG. 6 is a schematic diagram showing the operation state of the drum-integrated electric parking brake in accordance with an exemplary embodiment of the present invention.
Figure 6B:
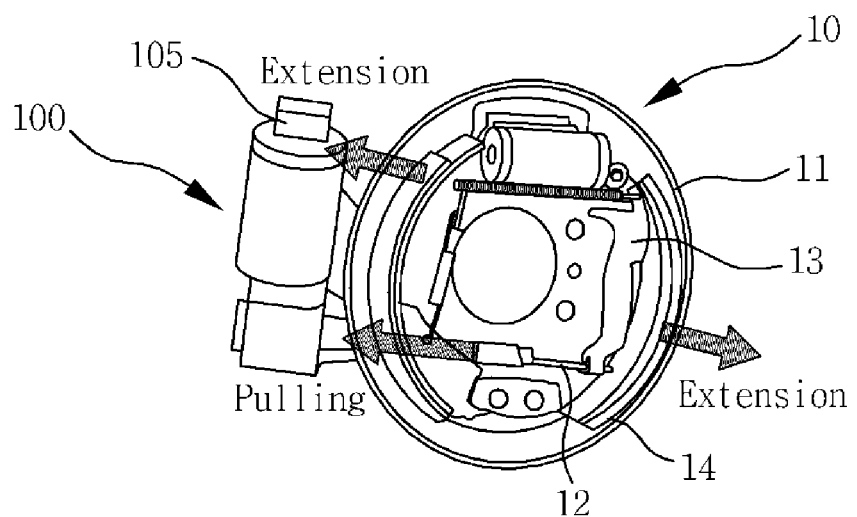
Figure 7A:
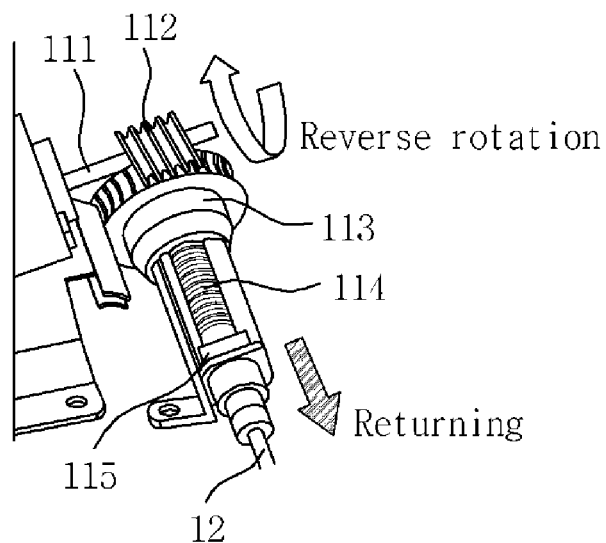
FIG. 7 is a schematic diagram showing the release of the operation of the drum-integrated electric parking brake in accordance with an exemplary embodiment of the present invention.
Figure 7B:
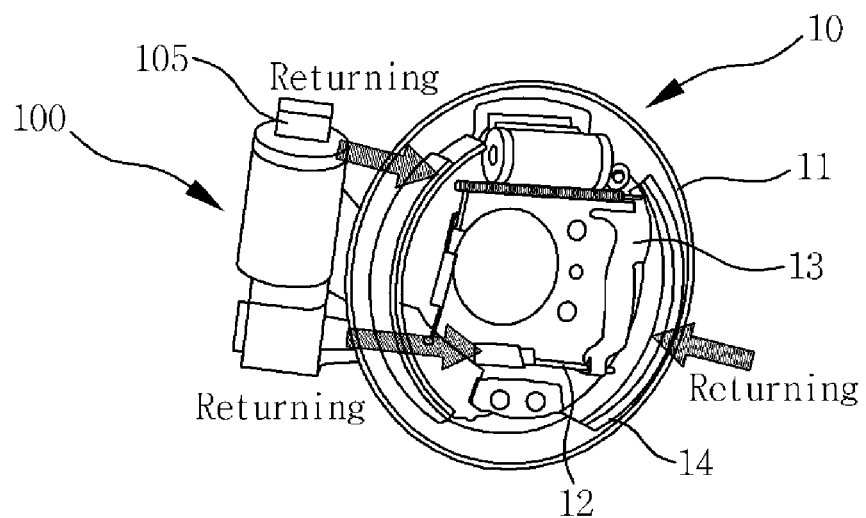

As shown in FIG. 3, the driven shaft 113a is attached to the inner circumference of the driven gear 113, and the power transmission shaft 114 penetrates the driven shaft 113a and the driven gear 113 and is fastened to the driven shaft 113a. Accordingly, the driven gear 113 is rotated in conjunction with the drive gear 112, and thus the driven shaft 113a is rotated. As a result, the power transmission shaft 114 penetrates the driven shaft 113a and moves linearly in one direction, and thus the parking cable 12 connected to the power transmission shaft 114 is pulled, thereby operating the drum brake 10.

That is, the power transmission shaft 114 and the driven shaft 113a are assembled together such that the rotational motion of the driven shaft 113a can be changed to the linear motion of the power transmission shaft 114.

Moreover, an anti-rotation sleeve 115 is formed to project integrally from the outer circumference of one end of the power transmission shaft 114 to prevent the power transmission shaft 114 from rotating together with the driven shaft 113a.

As shown in FIG. 2B, the anti-rotation sleeve 115 has a rectangular shape that can be in close contact with a case 102 in which the power transmission unit 115 is mounted, and thus the anti-rotation sleeve 115 is locked by the case, thereby preventing the rotation of the power transmission shaft 114.

Here, the anti-rotation sleeve 115 also serves to guide the linear motion of the power transmission shaft 114.

For reference, the case includes upper and lower cases 101 and 102 and is mounted on one side of the drum brake 10, and first and second load support members 117 and 118 are provided on both ends of the driven shaft 113a, respectively.

The first load support member 117 serves to rotatably support the driven gear 113 to the upper case 101 and to support the load acting in the rotational direction of the driven shaft 113a.

The second load support member 118 is interposed between the driven shaft 113a and the power transmission shaft 114 to support the load acting in the linear movement direction (i.e., in the axial direction of the driven gear) of the power transmission shaft 114.

In an exemplary embodiment of the present invention, the first and second load support members 117 and 118 may be mounted on the driven gear 113, the first load support member 117 is rotatably coupled to the upper case 101 and the second load support member 118 is rotatably mounted on an inner surface of the upper case 101.

Here, the first and second load support members 117 and 118 may be configured as a ball bearing and a thrust bearing, respectively.

Meanwhile, rotation number sensors 119 and 120 for detecting the rotation number of the motor 110 are provided at the rear of the motor 110 to detect the rotation number of the drive shaft 111 of the power change/transmission unit 116.

The rotation number sensors 119 and 120 serve to detect the rotation number of the drive shaft 111 and transmit a detection signal to the controller (ECU), and the controller receiving the signal determines a change in the rotation number of the drive shaft 111, thereby controlling the amount of current supplied to the motor 110.

That is, the controller receives information related to the parking operation such as the rotation number of the motor 110 and generates a control signal, thereby controlling the parking operation.

For example, the rotation number sensors 119 and 120 may include a magnet 119 mounted in the drive shaft 111 and a hall element 120 for detecting the rotation number of the magnet 119.

The magnet 119 is configured in such a manner that an N pole and an S pole are alternately placed at 90° intervals, and the hall element 120 detects the rotation number of the magnet 119 by measuring the strength of the magnetic field which varies according to the rotation of the magnet 119 and transmits the detected signal to the controller.

When the lining 14 of the drum brake 10 is worn out, the electric actuator 100 increases the rotation number of the drive shaft 111 to increase the amount of pulling of the parking cable 12 of the drum brake 10 such that the lining 14 is in closer contact with the friction surface of the drum 11, thereby generating a parking brake force.

The hall element 120 is mounted in a motor case 105 and connected to a connector 121, and the connector 121 includes a power line for supplying power to the motor 110 and a sensor line for supplying power to the hall element 120.

The motor case 105 is disposed on one side of the case 102 at the rear of the motor 110.

According to the above-described drum-integrated electric parking brake of the present invention, when a driver in a vehicle pushes an operation button to drive the electric actuator 100, the rotational force of the motor 110 is transmitted to the parking cable 12 through the power transmission shaft 114 as a final output. As a result, the parking cable 12 is pulled, the operating lever 13 of the drum brake 10 is then pulled, and thus the lining 14 attached to both shoes extends to the drum 11, thereby generating a parking braking force.

When the driver pushes the operation button in the vehicle to reversely drive the electric actuator 100 (or to reversely drive the motor), the parking cable 12 of the drum-integrated electric parking brake of the present invention is returned by the reverse rotational force of the motor 110 to return the lining 14 extending to the drum 11, thereby releasing the braking force.

As described above, the drum-integrated electric parking brake according to an exemplary embodiment of the present invention can reduce the weight and manufacturing cost and thus can be applied even to low-cost vehicles at a competitive price.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A drum-integrated electric parking brake apparatus comprising:
   a drum brake in which a lining is pivotally installed and extends and presses a drum when a parking cable engaged with the lining is pulled;
   an actuator selectively pulling the parking cable;
   a sensor member for detecting a rotation number of the actuator;
   a controller for controlling the amount of current supplied to the actuator by detecting a change in the rotation number of the actuator;
   a drive shaft connected to the actuator and rotated by a rotational force of the actuator;
   a driven shaft engaged with the drive shaft; and a power transmission shaft penetrating the driven shaft and engaged to the driven shaft, and moving linearly in an axial direction of the driven shaft by rotation of the drive shaft.

2. The drum-integrated electric parking brake apparatus of claim 1, wherein the power transmission shaft includes an anti-rotation sleeve formed integrally an end portion thereof to prevent the power transmission shaft from rotating together with the driven shaft.

3. The drum-integrated electric parking brake apparatus of claim 2, wherein the anti-rotation sleeve is slidably engaged with a case of the drum brake.

4. The drum-integrated electric parking brake apparatus of claim 3,
wherein the case includes a lower case and an upper case, the anti-rotation sleeve being slidably engaged with the lower case of the drum brake.

5. The drum-integrated electric parking brake apparatus of claim 3,
wherein a drive gear is formed to the drive shaft and a driven gear meshed with the drive gear is formed to the driven shaft, and
wherein first and second load support members are mounted on both sides of the driven gear, the first load support member being rotatably coupled to the upper case and the second load support member being rotatably supported onto an inner surface of the upper case.

6. The drum-integrated electric parking brake apparatus of claim 1, wherein the sensor member includes:
a magnet mounted in a drive shaft connected to the actuator; and
a hall element detecting the rotation number of the magnet.

* * * * *